(12) United States Patent
Badt, Jr. et al.

(10) Patent No.: US 7,376,670 B2
(45) Date of Patent: May 20, 2008

(54) SYSTEM AND METHOD FOR PROVISIONING PRESENCE APPLICATION SERVICES

(75) Inventors: Sig Badt, Jr., Richardson, TX (US); Atiya Suhail, Plano, TX (US)

(73) Assignee: Alcatel-Lucent, Paris (FR)

( * ) Notice: Subject to any disclaimer, the term of this patent is extended or adjusted under 35 U.S.C. 154(b) by 348 days.

(21) Appl. No.: 10/783,856

(22) Filed: Feb. 20, 2004

(65) Prior Publication Data
US 2005/0197995 A1    Sep. 8, 2005

(51) Int. Cl.
*G06F 17/00* (2006.01)
*G06F 9/44* (2006.01)

(52) U.S. Cl. .................. 707/104.1; 707/101; 707/102; 717/104; 717/120

(58) Field of Classification Search ............ 707/1, 707/101, 102, 104.1; 717/104, 120
See application file for complete search history.

(56) References Cited

U.S. PATENT DOCUMENTS

| | | | |
|---|---|---|---|
| 6,771,991 B1* | 8/2004 | Gupta et al. ............... | 455/566 |
| 2002/0150093 A1 | 10/2002 | Ott et al. | |
| 2002/0151313 A1 | 10/2002 | Stead | |
| 2003/0115311 A1* | 6/2003 | Johnston-Watt et al. .... | 709/223 |
| 2003/0182394 A1* | 9/2003 | Ryngler et al. ............. | 709/217 |
| 2004/0122896 A1* | 6/2004 | Gourraud ................... | 709/204 |
| 2004/0260749 A1* | 12/2004 | Trossen et al. ............. | 709/200 |
| 2005/0136946 A1* | 6/2005 | Trossen et al. .......... | 455/456.2 |

FOREIGN PATENT DOCUMENTS

| | | |
|---|---|---|
| WO | WO 98/54682 | 12/1998 |
| WO | WO 03/049401 A1 | 6/2003 |
| WO | WO 2004/114633 A1 | 12/2004 |

OTHER PUBLICATIONS

Mena, et al., Observer: An Approach for Query Processing in Global Information Systems Based on Interoperation Across Pre-existing Ontologies; First IFCIS International Conference on Cooperative Information Systems; Jun. 1996; pp. 14-25.

Schulzrinne, et al.; RPIDS—Rich Presence Information Data Format for Presence Based on the Session Initiation Protocol (SIP); IETF Internet Engineering Task Force; Internet Draft; Feb. 2003; pp. 1-21.

Day, et al; A Model for Presence and Instant Messaging; IETF RFC 2778; Feb. 2000; pp. 1-17.

(Continued)

*Primary Examiner*—Uyen Le (57) ABSTRACT

A system and method for provisioning presence application services using a customizable presence data model. An ontology depository having at least one domain-specific ontology model for a particular presence application is provided on a communications network. Presence client software associated with a general-purpose presence entity is customized by referencing a domain-specific ontology model of the ontology depository, whereby the presence entity becomes operable to engage in a particular presence application relating to the domain-specific ontology model.

30 Claims, 10 Drawing Sheets

OTHER PUBLICATIONS

Day, et al.; Instant Messaging/Presence Protocol Requirements; IETF RFC 2779; Feb. 2000; pp. 1-26.

M. Day, S. Aggarwal, G. Mohr, and J. Vincent; "Instant Messaging/Presence Protocol Requirements"; Network Working Group, Request for Comments: 2779; Feb. 2000; pp. 1-26.

M. Day, J. Rosenbert and H. Sugano; "A model for Presence and Instant Messaging"; Network Working Group, Request for Comments: 2778; Feb. 2000; pp. 1-17.

H. Schulzrinne, P. Kyzivat, V. Gurbani and J. Rosenbert; "RPIDS—Rich Presence Information Data Format for Presence Based on the Session Initiation Protocol (SIP)"; Internet Engineering Task Force; draft-schulzrinne-samplerpids-01.ps; Feb. 18, 2003; pp. 1-16.

I. Polikoff and D. Allemang; "TopQuadrant Technology Briefing"; Semantic Technology, Version 1.1; TQ03 Semantic Technology Briefing; Sep. 5, 2003; pp. 1-41.

R. Coyne and D. Allemang; "Ontology Myth or Magic? Toward the Practical Application of Ontology-enabled Knowledge Solutions"; TopQuadrant White Paper, TQ0403 Semantic Solutions-Getting Started; Sep. 11, 2003; pp. 1-28.

* cited by examiner

FIG. 8

SYSTEM AND METHOD FOR PROVISIONING PRESENCE APPLICATION SERVICES

BACKGROUND OF THE INVENTION

1. Technical Field of the Invention

The present invention generally relates to presence-aware communication networks. More particularly, and not by way of any limitation, the present invention is directed to a system and method for provisioning presence application services using a customizable presence data model.

2. Description of Related Art

With today's widespread use of the Internet as a major communication medium, data communication devices are now being designed so that they are capable of communicating over packet-switched networks. For instance, telephones, pagers, personal digital assistant devices, cell phones, handheld computers, and even fax machines can now be accessed and controlled from the Internet. Communication over a packet-switched network using communication devices that traditionally communicate over a circuit-switched telecommunications network is generally known as network telephony, or IP telephony when an IP network is involved.

Various types of user communication devices (e.g., a cell phone, laptop or handheld PC, desktop PC, and the like) can identify themselves to the network using a suitable identifier (e.g., username@company.com). "Presence" refers to, for example, the availability, proximity, activity level or operating state of a user on a network. The ability for users to monitor each other's presence is a feature offered in connection with many applications that support network telephony. For example, instant messaging applications such as MSN® or Yahoo® have an "available buddy" feature, in which a user of the application can determine whether select users are available for engaging in communication. The data retrieved and returned to the buddy list, e.g. "John OFFLINE" or "Susan ACTIVE", is known as "presence information," and is generally maintained by a presence server in the data network, often a dedicated server. Typically, the presence server supports network telephony protocols such as the Session Initiation Protocol (SIP). Users can register their communication devices with the presence server in order to have their presence maintained and to allow various programs on the network to facilitate network telephony services. A first device user wishing to detect the presence of a second device user does so by "subscribing" with the presence server, such as via a SIP SUBSCRIBE message. The presence server intermediates between the first device user (also known as the watcher or subscriber) and the second device user to facilitate the communication of the second device user's presence information to the first device user.

Additional details about presence and presence modeling are set forth in the Internet Engineering Task Force (IETF) Request for Comment (RFC) 2778 entitled "A model for Presence and Instant Messaging," dated February 2002; RFC 2779 entitled "Instant Messaging/Presence Protocol Requirements," dated February 2002; and Internet-Draft identified as <<draft-schulzrinne-simple-rpids-01.ps>> and entitled "RPIDS—Rich Presence Information Data Format for Presence Based on the Session Initiation Protocol (SIP)," dated Feb. 18, 2003, which are incorporated herein by reference.

Inasmuch as conventional presence systems have been useful in a variety of applications, only a few forms of presence are currently in use in today's telecommunications networks as exemplified hereinabove. On the other hand, as the technology evolves and more presence-aware networks become deployed in diverse fields, there arises a need to accommodate many forms and types of presence in the future. Newer forms of presence may appear whereas some old forms may disappear over time. Provisioning additional presence forms adaptable for multiple applications is particularly difficult in the existing systems, however, because of their hardwired application-specific implementation which necessitates expensive reconfiguration and recompilation.

SUMMARY OF THE INVENTION

Accordingly, the present invention is directed to a system and method for provisioning presence application services using a customizable presence data model. An ontology depository having at least one domain-specific ontology model for a particular presence application is provided on a communications network. Presence client software/firmware associated with a general-purpose presence entity is customized by referencing a domain-specific ontology model of the ontology depository, whereby the presence entity becomes operable to engage in a particular presence application relating to the domain-specific ontology model.

BRIEF DESCRIPTION OF THE DRAWINGS

The accompanying drawings are incorporated into and form a part of the specification to illustrate the preferred embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
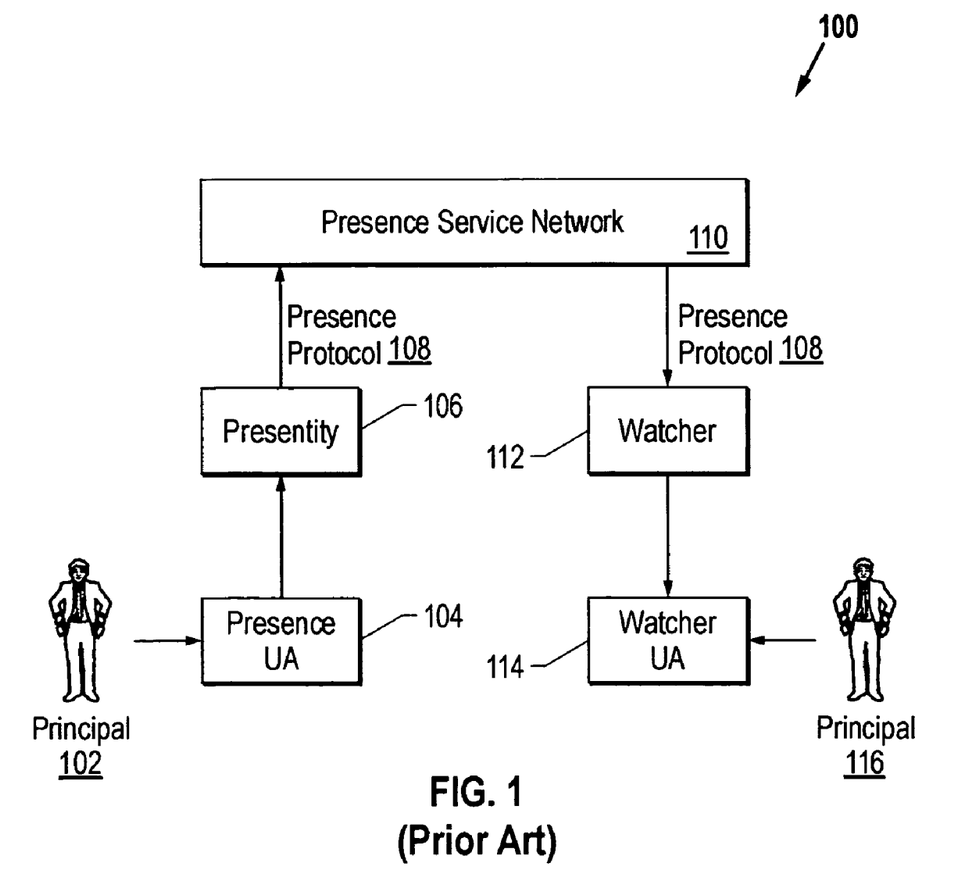
FIG. 1 (Prior Art) depicts a conventional presence application system.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is a conventional presence application system 100 where a Sender Principal 102 interfaces with a presence user agent (UA) 104 for transmitting presence information via a presentity 106. An application-specific presence protocol 108 is used for providing presence information to a presence service network (PSN) 110 that is embodied as an IP-based communications network. At the other end of transmission, a watcher 112 obtains the presence information using the presence protocol 108, which is provided to a Receiver Principal 116 who interfaces with a watcher user agent (UA) 114 for controlling the watcher 112.

Figure 2:
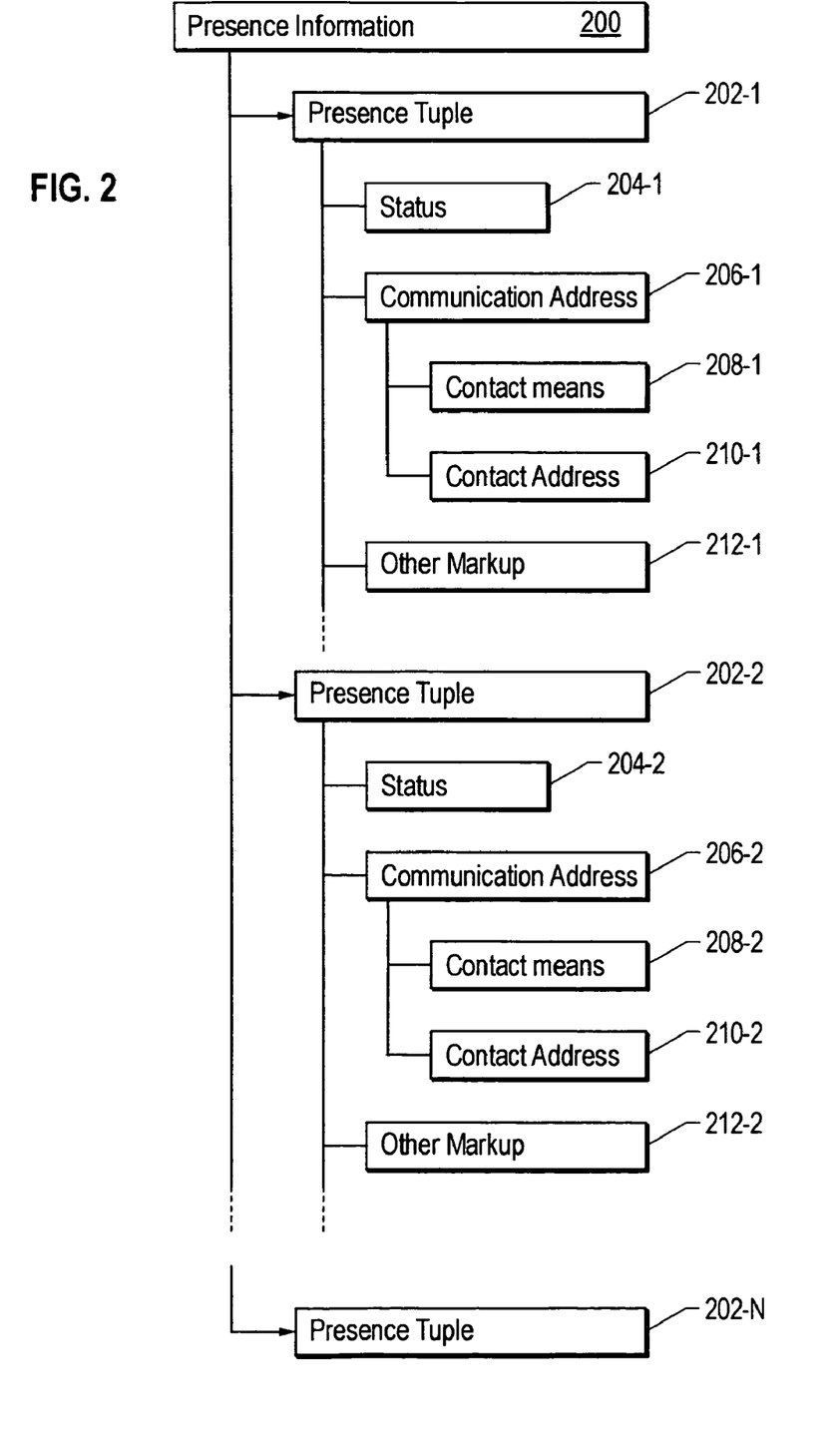
FIG. 2 depicts an exemplary embodiment of a presence information model format for transmission in a presence service.

FIG. 2 depicts an exemplary embodiment of a presence information model format 200 for transmission in a presence service effectuated by a presence application system such as, for example, the presence application system 100 set forth above. As illustrated, the presence information model 200 comprises an arbitrary number (N) of elements, referred to as "presence tuples" 202-1 through 202-N. Each such element includes a status marker operable to convey information (such as, e.g., online/offline/busy/away/do not disturb) for indicating a presence condition or an attribute, an optional communication address, and one or more optional other presence markups. A communication address includes a communication contact means and a contact address. By way of example, reference numerals 202-1 and 202-2 refer to two presence tuples of the presence information model 200, wherein status markers 204-1, 204-2, communication addresses 206-1, 206-2, and other markups 212-1, 212-2 are illustrative. Communication address 206-1 is further defined by a contact means 208-1 and a contact address 210-1. Likewise, communication address 206-1 is also defined in terms of a contact means 208-2 and associated contact address 210-2. It should be appreciated that although only one communication address per presence tuple is shown, there may be additional communication addresses for any presence tuple, each having its own contact and contact address information, based on the particular presence service application. For instance, in addition to an instant messaging address, a presence tuple may include a communication address that is defined for conventional wireless or wireline telephony, with the corresponding contact address being a cell phone number or a POTS telephone number.

By provisioning different status markers and related markups in the presence tuples, a presence service may be designed appropriately for a particular application. As pointed out in the Background section of the present disclosure, however, although conventional presence systems have been useful in a variety of applications, such presence systems are typically able to accommodate only a small number of presence types, that too in a hardwired configuration that is not easily upgradable to newer types and forms of presence.

Figure 3A:
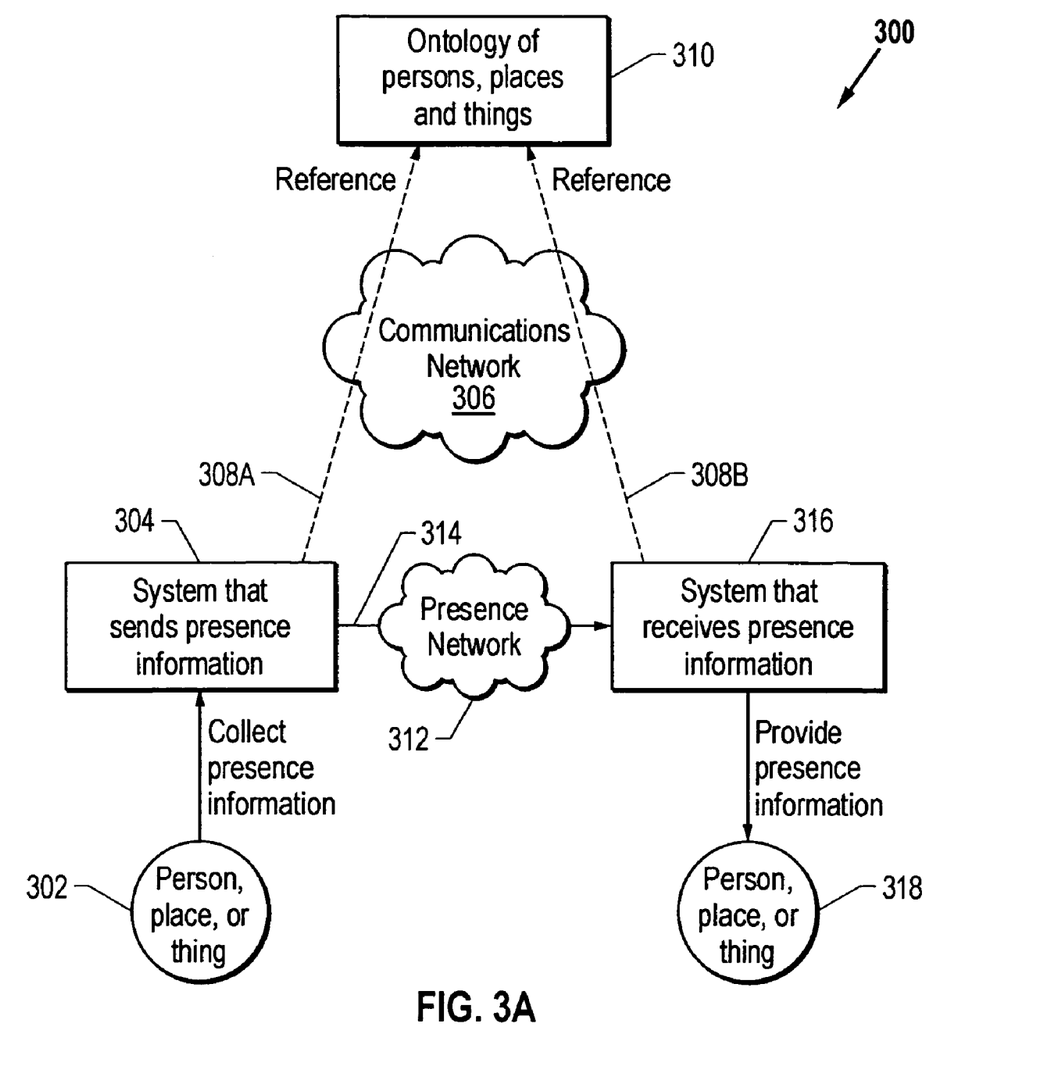
FIG. 3A depicts an exemplary presence application system according to one embodiment of the present invention.

FIG. 3A depicts an exemplary presence application system 300 according to one embodiment of the present invention wherein a general-purpose presence provisioning scheme is operable to be customized for any number and form of presence information types known or heretofore unknown. As used herein, the term "presence" means information about a person, place or thing that is made available to another person, place or thing by way of a communications network. Moreover, such information may be changing rapidly or otherwise within the context of a particular presence application. Central to the provisioning scheme for supporting customizable presence applications is the notion of knowledge engineering or ontology engineering, wherein a data model (i.e., metadata or schema) is constructed for a particular presence application based on the knowledge of the application domain, which data model is made available to any general-purpose presence entity via a suitable referencing mechanism for customizing. As used herein, a domain-specific "ontology model" is a "data skeleton" or "schema" that describes and defines a structure of knowledge (i.e., semantics) appropriate for a particular presence application, which ontology model may be developed using any known or heretofore unknown semantic software technologies and languages. Accordingly, an ontology model for a presence application includes a collection of abstracted entities (e.g., beings, concepts or objects) that are appropriately classified (i.e., as a taxonomy) as well of relationships among the entities. Further, such an ontology model may contain information about how to collect presence data from persons, places and things, and how to distribute presence data to persons, places and things.

In accordance with the teachings of the present invention, one or more ontology models describing the relationships among the entities of interest (i.e., persons, places and things) may be made available as part of an ontology depository 310 on an IP-based communications network 306. In one embodiment, such a communications network may comprise the Internet and a domain-specific ontology model wherein each entity is provided with a list of presence attributes may be published for a particular presence application as part of an ontology server supported by a presence service provider or by a third-party developer.

Those skilled in the art should recognize that the domain-specific ontology models may be represented using any of a number of knowledge-representation systems, including semantic nets and entity-relationship hierarchical graphs where the relationships may comprise inheritances (e.g., "kind of" relationships such as "lilies and daffodils are kinds of flowers" or "is a" relationships such as "a taxi driver is a person") as well as other, more advanced relationships e.g., "part of", "precedes in process", "reports to", and the like. Further, the entities in an ontology model can have qualifying attributes, and an ontology may also describe restraints ("rules") on applicable values for attributes and entities. By way of example, a domain-specific ontology model for a particular presence application may comprise a data model developed in well-known Markup languages such as Extended Markup Language (XML), Unified Markup Language (UML), General Markup Language (GML), Agent Markup Language (AML), et cetera. Further, such data models may also be developed as Resource Description Framework (RDF) applications, Ontology Inference Layer (OIL) applications, Ontology Web Language (OWL) applications, Semantic Web Initiative (SWI)-compliant applications, and Meta Object Framework (MOF) applications.

Continuing to refer to FIG. 3A, a sending system 304 is operable as a presence entity to collect presence information about an entity 302 which may be a person, place or thing (i.e., a Sender Principal). A presence client module (not shown in this FIG.) associated with the sending system 304 is not designed specifically for any particular presence service application (e.g., a transportation system application, a security monitoring system application, any type of private enterprise business applications, government agency applications, and instant messaging applications, and the like), but is customizable to become an application-specific presence client by referencing a domain-specific ontology model disposed at the ontology depository 310 via a reference path 308A. In one implementation, the referencing process is effectuated by means of inputting by the user a Uniform Resource Locator (URL) associated with the ontology depository 310 having the particular ontology model. Accordingly, a presence client module (which may be configured as a software/firmware structure) of the sending system 304 is operable to dynamically reference a domain-specific ontology model for customizing the presence entity for a particular presence application based thereon. In a further variation, the presence client module is operable to effectuate a static reference to a domain-specific ontology model during the client module's compile time, where the ontology model's structure is integrated within the presence client module somewhat akin to the manner in which the structure of a management information database (MIB) is integrated with a network node disposed in a Simple Network Management Protocol (SNMP) environment.

Upon effectuating an ontology reference with respect to a particular data model, the sending system 304 is operable to transmit the presence information by means of a presence information pathway 314 via a presence network 312 to a receiving system 316. It should be recognized by one of ordinary skill in the art that whereas the presence network 312 may be provided as a separate network, it may also be implemented as part of the communications network 306 that is used for effectuating ontology referencing paths. Additionally, in one embodiment, the presence network 312 may be implemented as a Session Initiation Protocol (SIP)-based network including various SIP-aware and presence-aware intermediary nodes that are operable to reference the ontology depository 310 as needed.

Similar to the sending system 304, the receiving system 316 includes a general-purpose presence client module that is customizable by referencing the applicable domain-specific ontology model via a reference path 308B. Thereafter, upon receiving the presence data transmitted by the sending system 304 and understanding the information contained therein, the receiving system 316 provides the presence information to an entity 318 comprising a person, place or thing, based on the presence application.

By way of illustration, where an ontology is represented as a UML Object diagram, a digital format called XML-based Metadata Interchange or XMI may be used for communicating the presence information in a standardized manner between the sending and receiving entities. Likewise, the domain-specific ontology models may be represented as Document Type Definitions (DTDs) that are used for standardizing transmissions involving XML data. Once an ontology model is published on a communications network such as the Internet, various presence-aware entities that transmit, receive, process presence information can obtain a reference to that ontology model. Whereas a URL-based referencing mechanism has been described hereinabove, it should be apparent that in the context of the present patent application a reference is any form of address information that can be used to access an ontology model by way of a communications network. It should be further recognized that more than one variant of an ontology model may be published on the network at the same time. In such situations, presence information needs to contain an indication that specifies which ontology variant is referenced by the sender of the information. It is also possible to have what are known as "cascading ontologies" wherein one ontology model contains a reference to another ontology model, similar to cascading style sheets in HyperText Markup Language (HTML). Accordingly, a referencing ontology model may extend, reduce, or modify the referred ontology model.

Figure 3B:
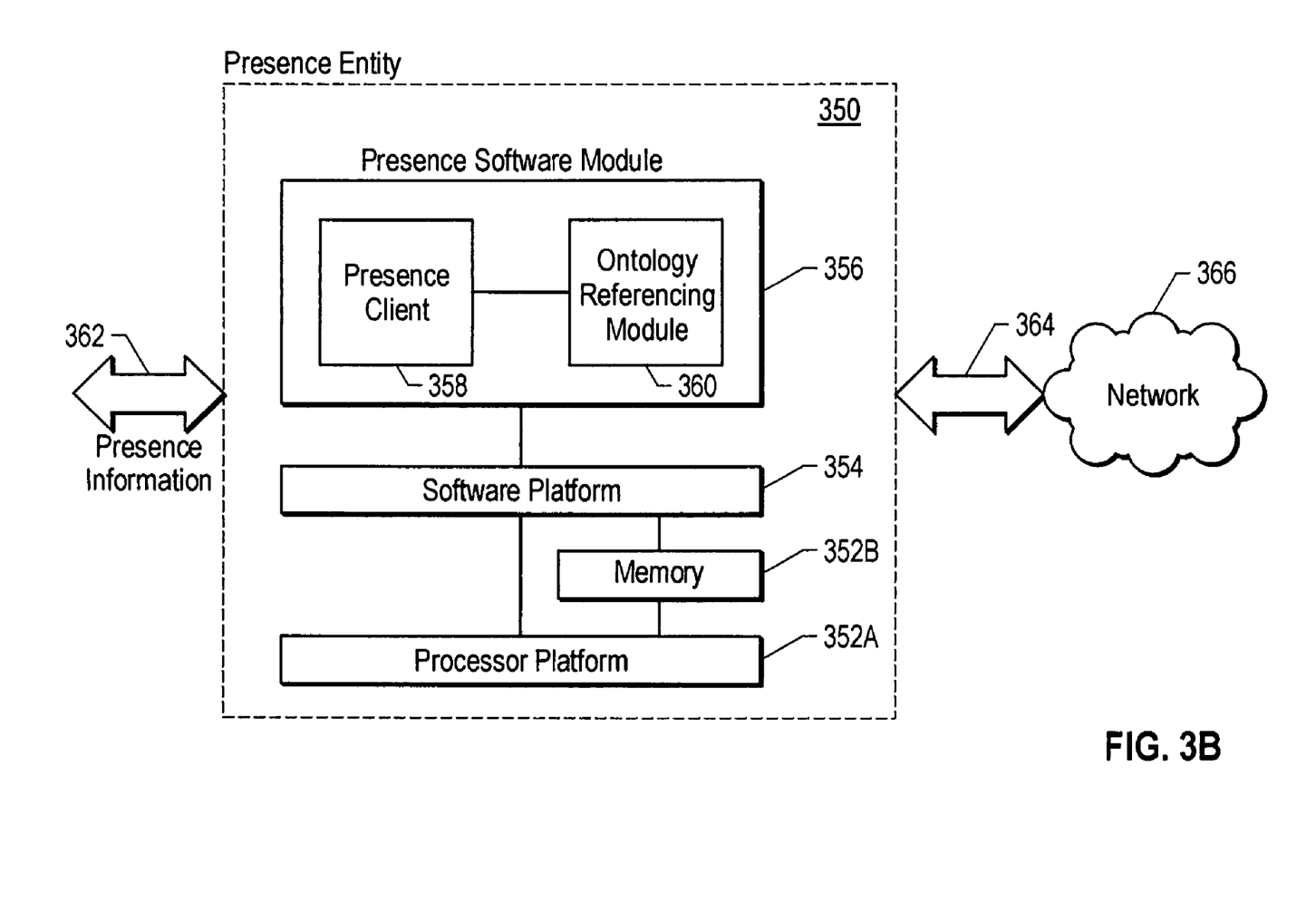
FIG. 3B depicts an exemplary presence entity operable in a presence application system in accordance with the teachings of the present invention.

FIG. 3B depicts an exemplary general-purpose presence entity 350 operable in a presence application system in accordance with the teachings of the present invention. A processor platform 352A and memory 352B provide the hardware for supporting an OS-specific software platform 354 associated with the presence entity 350. A presence software module 354 executable as part of the software environment of the presence entity 350 includes a presence client software 358 and an ontology referencing module 360. Presence information is obtained from or delivered to a Principal (i.e., person, place or thing) via a pathway 362. A network 366 provides the presence service network infrastructure for supporting ontology reference pathways as well as presence information pathways, collectively depicted as pathway 364.

By way of one implementation scheme, it should be appreciated that the presence entities or systems that send, process, and receive presence information, based on appropriately customizing their presence client software, can operate as run-time presence systems, as alluded to in the foregoing discussion with reference to FIGS. 3A and 3B. The purpose of a domain-specific presence ontology model is therefore to provide input to a run-time presence system, both during its development time as well as its runtime. During development time, the presence data model can be provided to suitable automated development tools which can automatically generate code fragments. Human software programmers may then extend such fragments appropriately. Also, whereas certain parts of the run-time presence systems can be generated automatically (e.g., by using ontology compilers), other portions need to be handled by human programmers having domain area expertise. The ratio between these two portions depends on the amount of information in a presence ontology model. In general, the more information there is in an ontology model, the greater the automation can be. In one embodiment, a presence data model may contain only classes, relations and attributes, which can be used for generating data structures or class stubs by automated development tools. On the other hand, actual subroutines or methods required for a full-fledged presence application service may have to be coded by knowledge engineers.

In another embodiment, a presence ontology model can contain methods, subroutines as well as code fragments, which may be utilized by automatic development tools to produce a complete presence application system operable as a run-time system. Methods in the presence model in such a scenario can contain information about how the following actions are performed: (i) how to collect presence information; (ii) how to process presence information; and (iii) how to present presence information in a suitable man-machine interface. In yet another embodiment, the information in a presence data model can be so complete that a new form of presence can be introduced into a run-time presence system without rewriting, recompiling, or installing the existing presence client software.

Figure 4A:
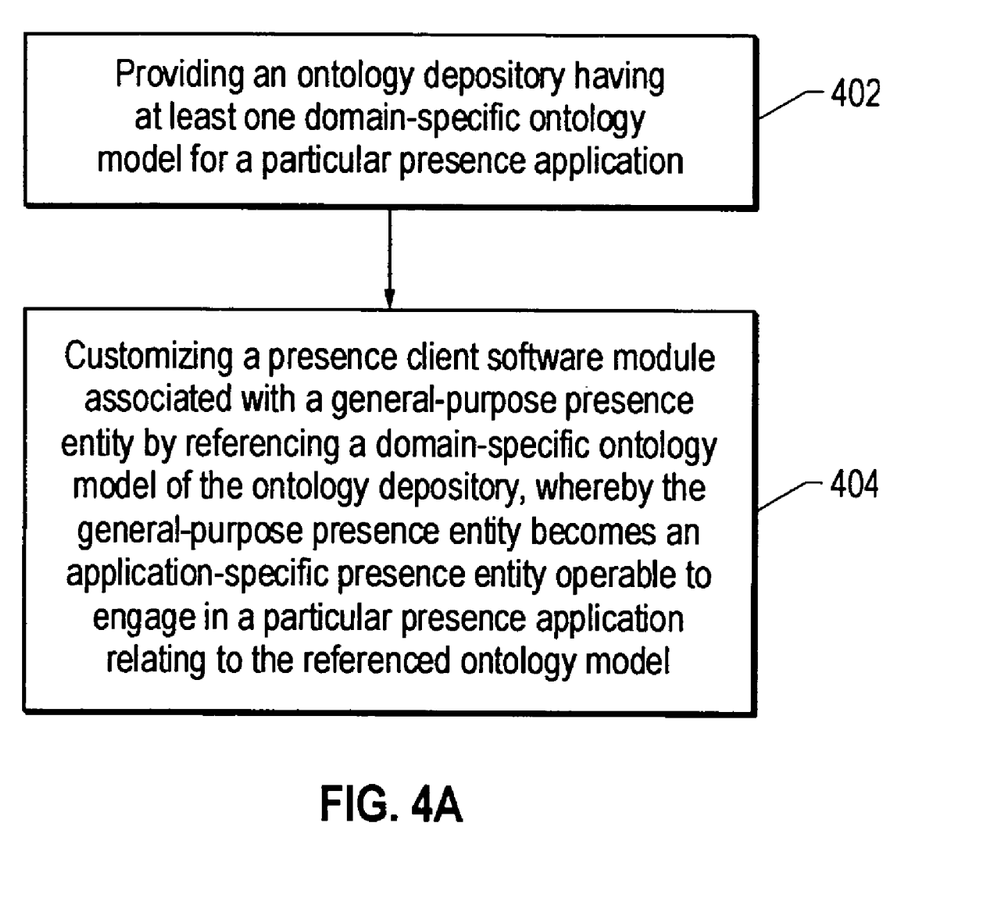
FIG. 4A is a flow chart of a provisioning methodology for supporting presence applications using a customizable presence data model.

Referring now to FIG. 4A, shown therein is a flow chart of a service provisioning methodology for supporting presence applications in accordance with an embodiment of the present invention. At block 402, an ontology depository having at least one domain-specific ontology model a particular presence application is provided. As pointed out earlier, such a depository may comprise an ontology server that publishes an ontology model specifying various presence attributes relating to persons, places and things involved in the particular presence application as well as their relationships. A general-purpose presence client software module associated with a presence entity is customized for effectuating the particular presence application by referencing the domain-specific ontology model associated therewith (block 404).

Figure 4B:
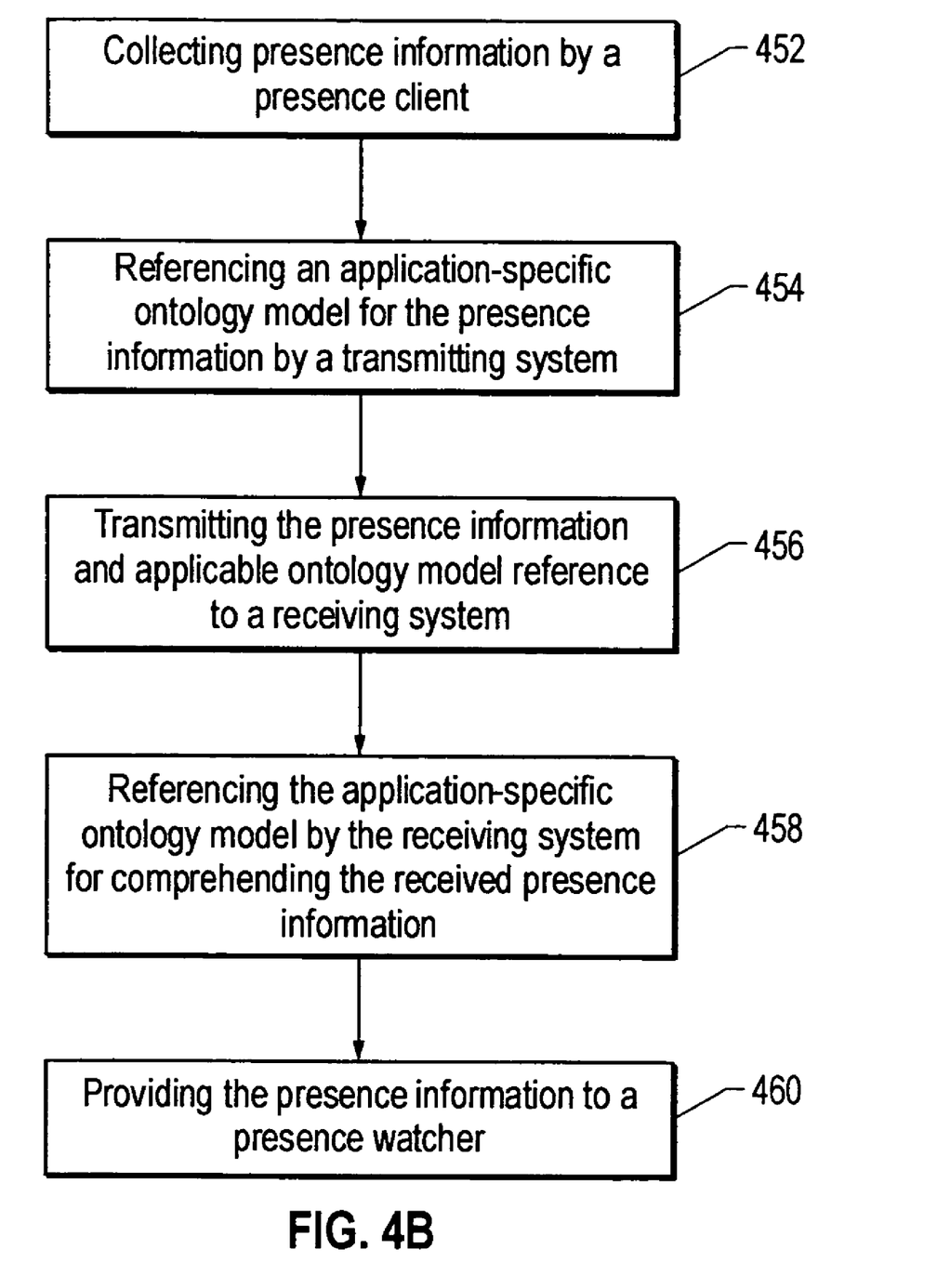
FIG. 4B is a flow chart of one embodiment of a presence application method.

FIG. 4B is a flow chart of one embodiment of a presence application method. Upon collecting presence information by a presence client (block 452), an application-specific ontology model is referenced by a transmitting system (block 454). Based thereon, the presence information is transmitted, which may include an indication of the applicable ontology model reference, via a presence service network to a receiving system (block 456). Subsequently, the receiving system references the application-specific ontology model for "comprehending" the received presence information (block 458), which is then provided to a receiving Principal (block 460).

Figure 5:
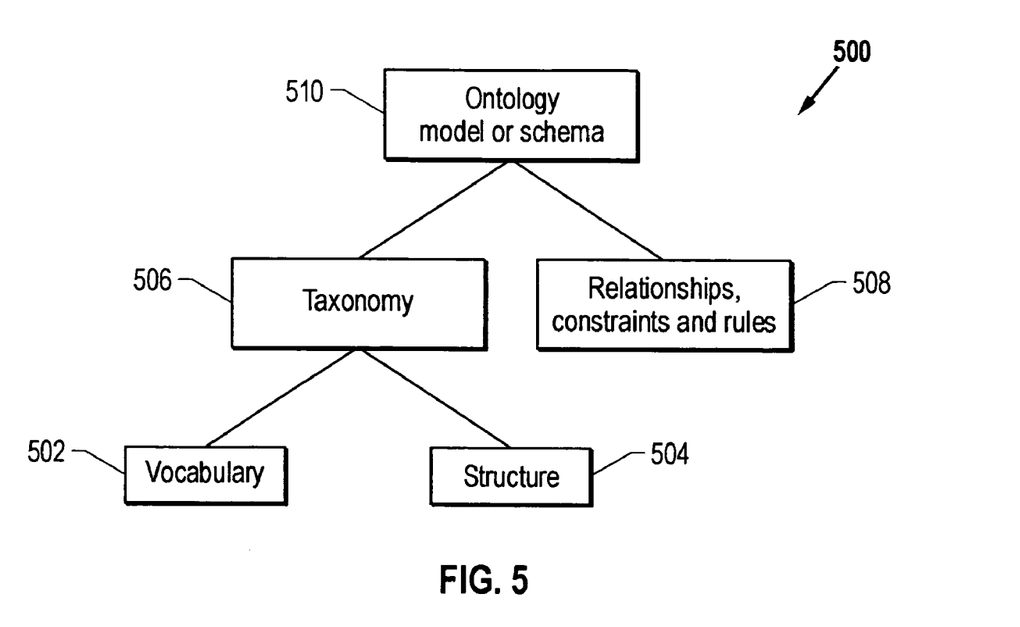
FIG. 5 depicts a construction methodology of an exemplary domain-specific ontology model that may be referenced by a general-purpose presence entity for effectuating a domain-specific presence application.

FIG. 5 illustrates a construction methodology of an exemplary domain-specific ontology model that may be referenced by a general-purpose presence entity for effectuating a domain-specific presence application. As explained previously, for an application area of interest, an ontology represents key concepts, their properties, relationships and associated rules. At the basic level, the knowledge of the application domain is defined in terms of a vocabulary 502 and its structure 504. Together, they comprise a formal classificatory scheme called taxonomy 506 of the application domain. Superimposed with formal relationships, rules and constraints 508, the taxonomy 506 operates as the ontology model or schema 510 for the application area of interest.

Figure 6:
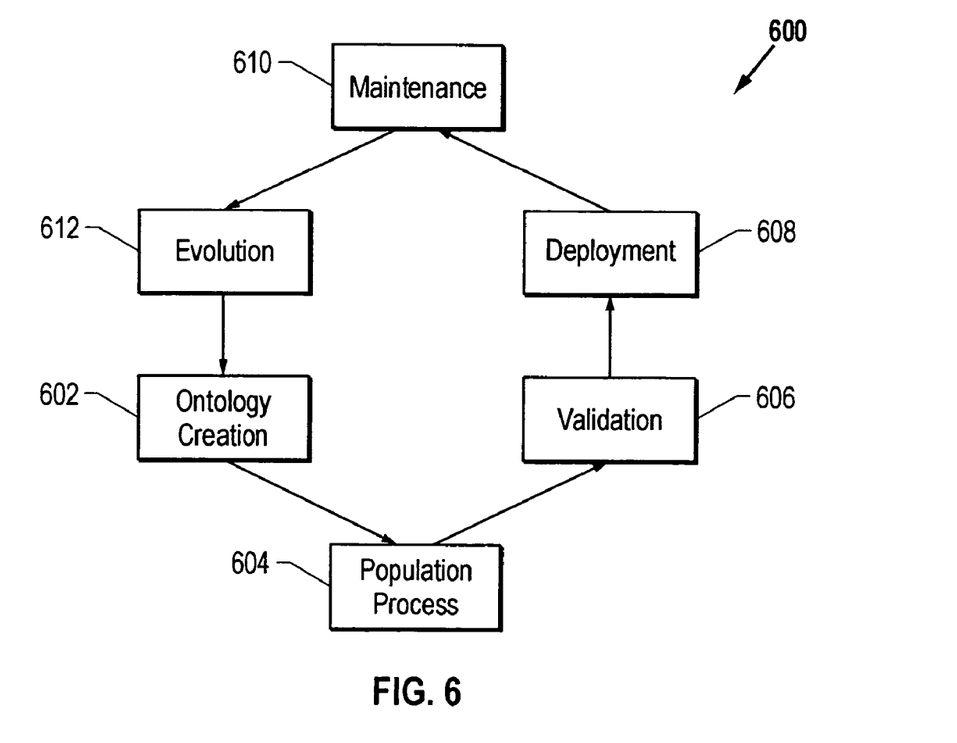
FIG. 6 illustrates an embodiment of a life cycle of a domain-specific ontology model.

FIG. 6 illustrates an embodiment of a life cycle of a domain-specific ontology model. As shown, an ontology life cycle 600 spans from creation 602 to evolution 612 via a number of stages. Domain-specific ontology may be created from the beginning, using a tool for editing and creating class structures (e.g., persons, places and things), usually with an interface that is somewhat similar to a file system directory structure. Application-specific text mining may be used to extract appropriate attribute terminology from available text documents, which may also provide a starting point for ontology creation. Population process 604 refers to the process of generating instances of classes and linking them to external sources, if necessary. Deployment 608 involves publishing the ontology model on a public communications network, e.g., the Internet. As new presence applications and attributes are added, or where old presence forms disappear, the ontology models are validated (block 606) and maintained (block 610), including evolution (block 612) of a particular model.

Figure 7A:
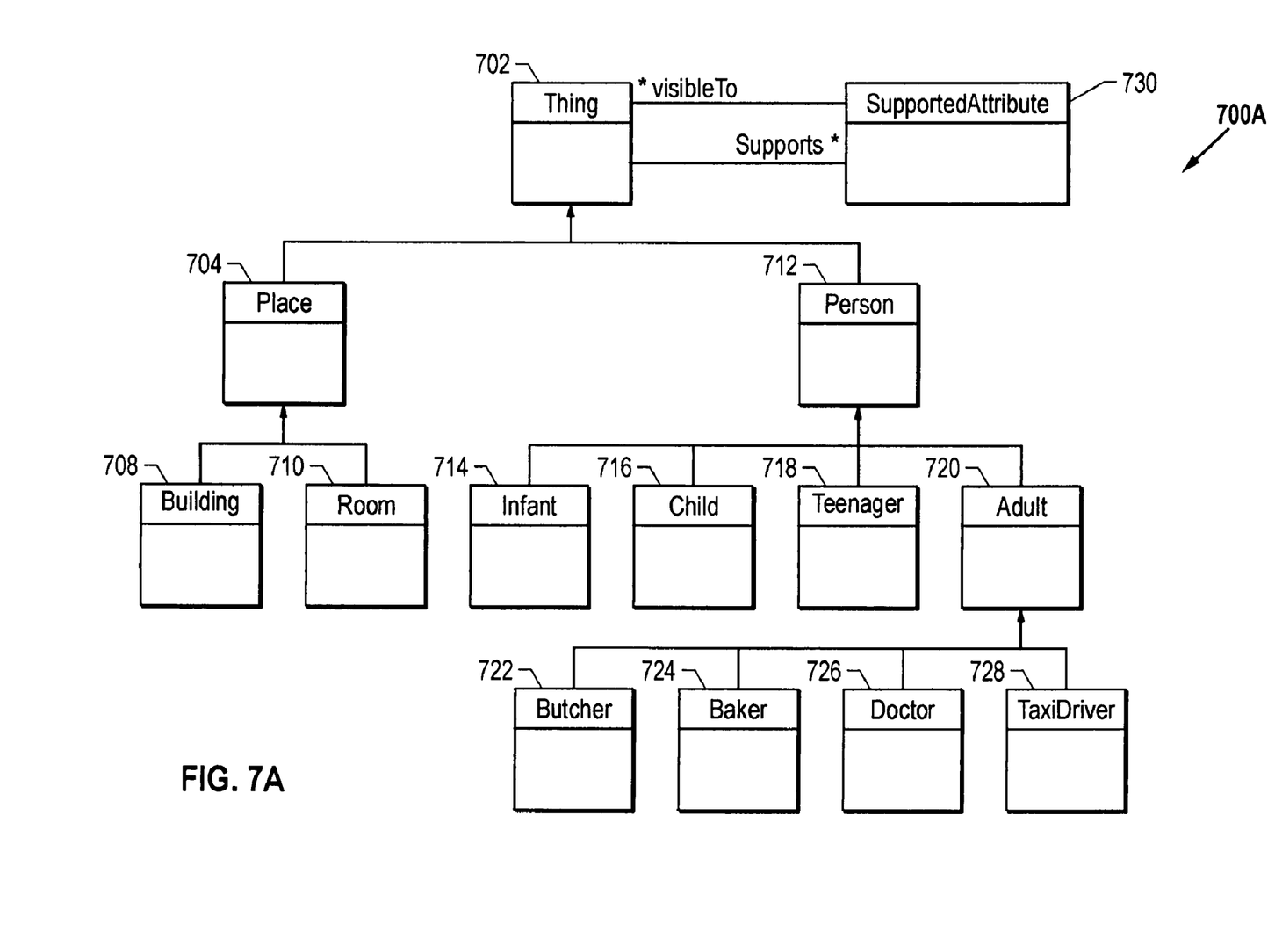
FIGS. 7A-7C illustrate an exemplary ontology model for use in a presence application in accordance with the teachings of the present invention.
Figure 7B:
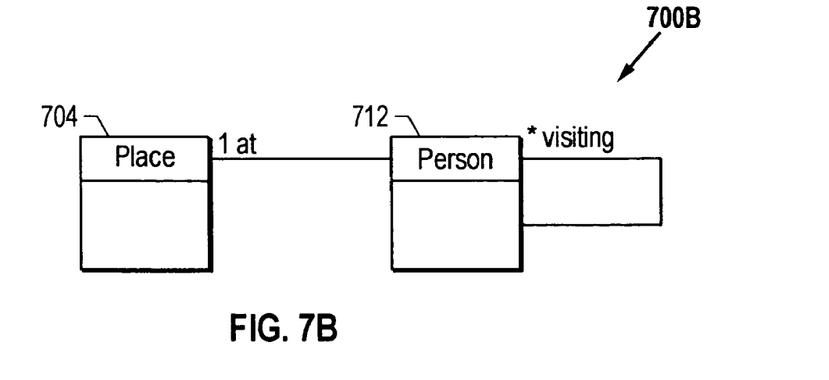
Figure 7C:
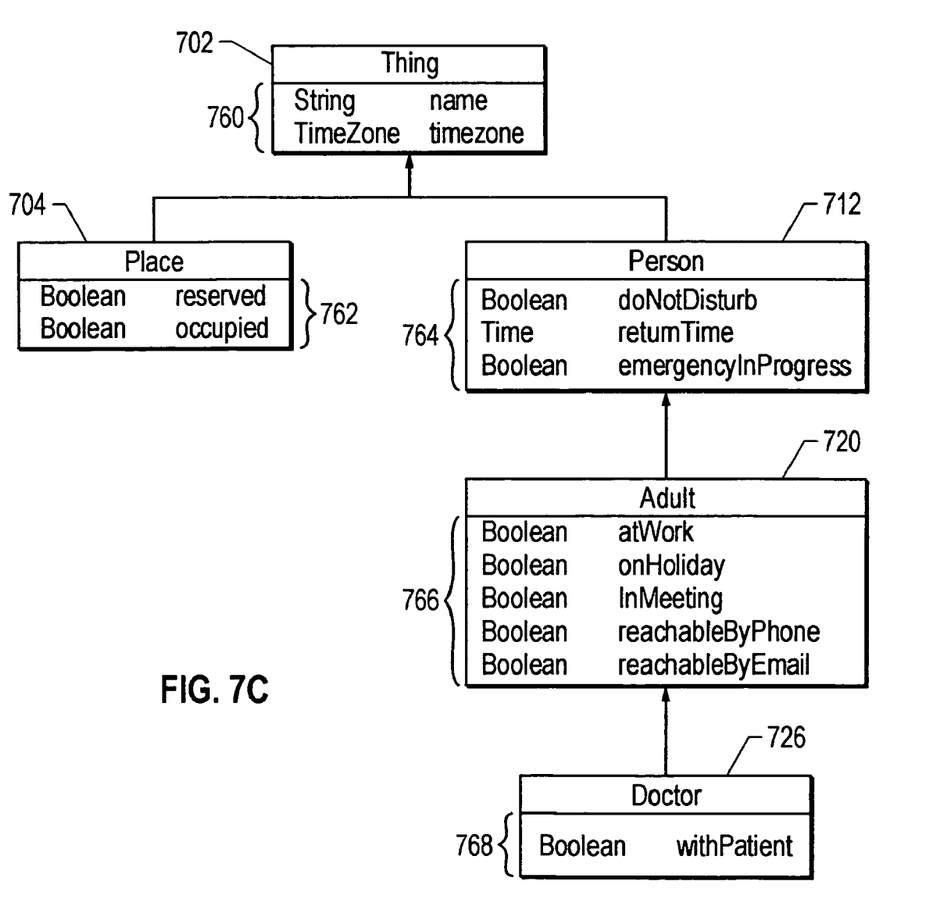

FIGS. 7A-7C illustrate an exemplary ontology model for use in a presence application involving persons, places and things in accordance with the teachings of the present invention. In particular, reference numeral 700A in FIG. 7A refers to a taxonomy or data model of three classes of entities, i.e., persons, places and things, in a UML Object diagram, where the boxes represent classes and the arrows represent inheritance by way of the "is a" relationship (i.e., "a Butcher is an Adult"). Reference numerals 722, 724, 726 and 728 refer to entities identified as Butcher, Baker, Doctor and TaxiDriver, respectively, each of which entities is an Adult 720. Likewise, each of the entities identified as Infant 714, Child 716, Teenager 718 and Adult 720 is a Person 712.

Each of the entities represented as Building 708 and Room 710 is a Place 704. At the highest level of hierarchy, Place 704 and Person 712 are a Thing 702.

It should be apparent that a directed line connecting any two boxes in the data model 700A represents an inheritance relationship (also called an association) between the two classes represented. Appropriate symbols may be provided at either end of the line to represent the cardinality of the association. For instance, an asterisk (*) may mean that a relationship has a cardinality of zero or more. By way of illustration, for instance, Thing 702 supports zero or more SupportedAttributes 730. That is, every entity called Thing in the ontology model 700A has a number of attributes, but not all are supported, as shown by an asterisk at the SupportedAttributes box 730. Whatever attributes are supported for Thing 702, each entity that inherits from Thing 702 has that set of attributes in addition to others that may be defined specifically for the entity. Also, as shown in FIG. 7A, every SupportedAttribute has visibility to zero or more Things, meaning some attributes are visible to some Things but not to other Things of the data model 700A.

FIG. 7B depicts another exemplary presence relationship embodiment 700B between the entities on the same level of inheritance hierarchy. As illustrated, the embodiment 700B exemplifies a visiting relationship between Person 712 and Place 704 that formally describes when and how often Person 712 visits Place 704. FIG. 7C depicts some of the classes of the data model 700A in additional detail with certain presence attributes. Reference numeral 760 refers to two presence attributes defined for Thing 702. Reference numeral 762 refers to presence attributes having Boolean values defined for Place 704. Likewise, presence attributes 764, 766 and 768 refer to the presence attribute sets defined respectively for Person 712, Adult 720 and Doctor 726. As one skilled in the art will readily recognize, a presence attribute of a parent class is also operable as an attribute of a child class because of the inheritance. Further, although single inheritance relationships have been set forth in the data model described hereinabove, it should be apparent that multiple-inheritance relationships may also be possible for certain ontologies.

Figure 8:
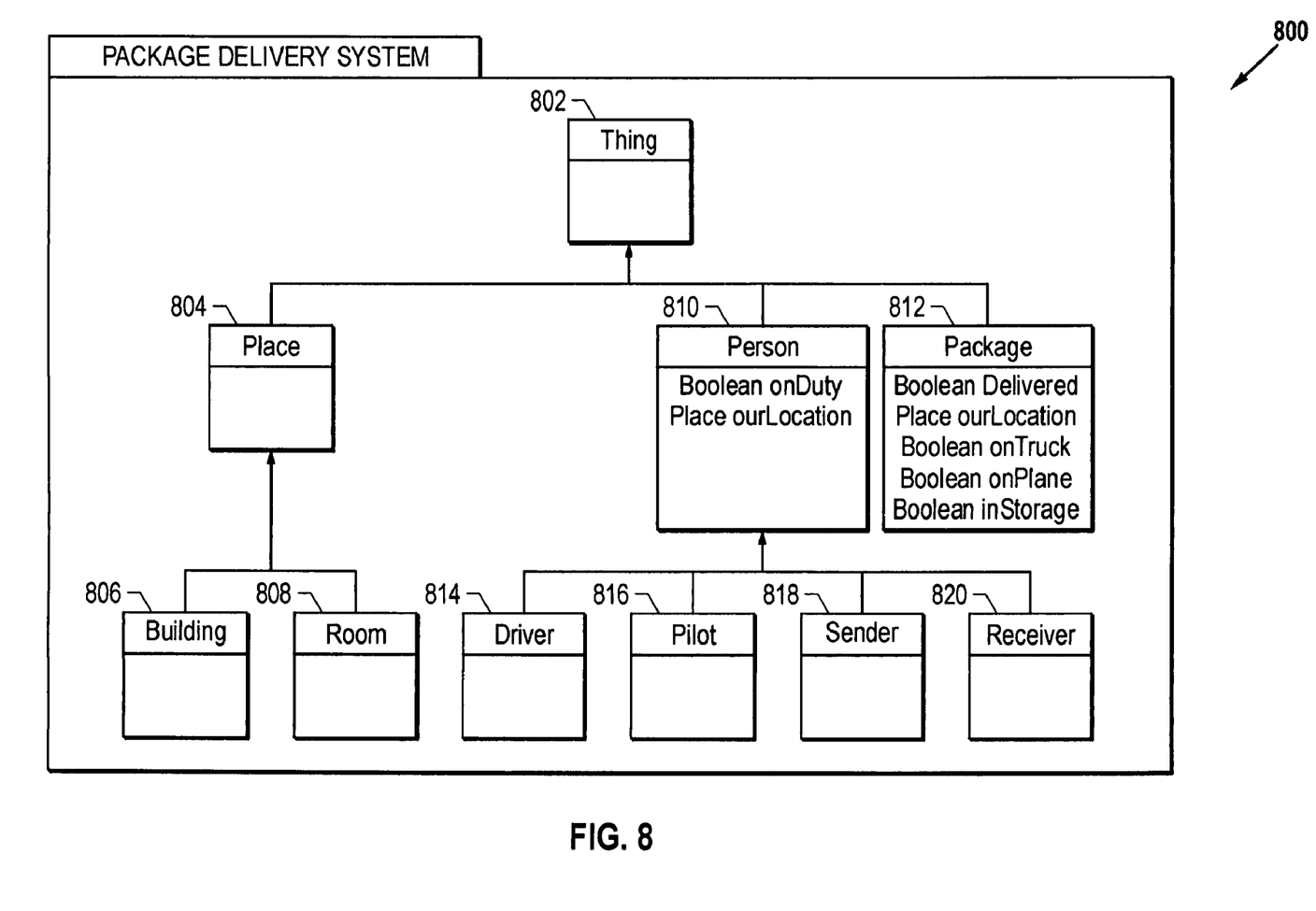
FIG. 8 is an exemplary ontology model adapted for a presence application such as a package delivery system.

FIG. 8 is an exemplary ontology model involving persons, places and things adapted for a presence application such as a package delivery system 800. Similar to the discussion set forth above, Building 806 and Room 808 are inherited from the class entity identified as Place 804. Likewise, entities Driver 814, Pilot 816, Sender 818 and Receiver 820 are inherited from Person 810. Place 804, Person 810 and another class entity called Package 812 are inherited from Thing 802, which may be provided with various application-specific presence attributes.

Based on the foregoing Detailed Description, it should be appreciated that the present disclosure provides for an abstract user model for advantageously implementing various presence applications by way of customizing general-purpose presence systems as new forms and types of presence data arise. Concept development, design, validation, and deployment of newer presence applications may therefore be accelerated in a cost-efficient manner.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A provisioning system for supporting presence applications, comprising:
an ontology depository having at least one domain-specific ontology model accessible via the Internet for a particular presence application, wherein the ontology model for the particular presence application includes a collection of:
abstracted entities that are appropriately classified;
relationships among the entities; and
information about how to collect presence data from persons, places and things; and
a presence entity having a structure operable to reference a domain-specific ontology model of said ontology depository via the Internet for customizing a presence client software module associated with said presence entity, whereby said presence entity becomes operable to engage in a particular presence application relating to said domain-specific ontology model.

2. The provisioning system for supporting presence applications as recited in claim 1, wherein said at least one domain-specific ontology model for a particular presence application comprises a Unified Markup Language (UML)-based data model.

3. The provisioning system for supporting presence applications as recited in claim 1, wherein said at least one domain-specific ontology model for a particular presence application comprises an Extended Markup Language (XML)-based data model.

4. The provisioning system for supporting presence applications as recited in claim 1, wherein said at least one domain-specific ontology model for a particular presence application comprises a semantic net data model.

5. The provisioning system for supporting presence applications as recited in claim 1, wherein said at least one domain-specific ontology model for a particular presence application comprises a General Markup Language (GML)-based data model.

6. The provisioning system for supporting presence applications as recited in claim 1, wherein said at least one domain-specific ontology model for a particular presence application comprises a data model based on a semantic software application selected from the group consisting of a Resource Description Framework (RDF) application, an Ontology Inference Layer (OIL) application, an Ontology Web Language (OWL) application, a Semantic Web Initiative (SWI)-compliant application, and a Meta Object Framework (MOF) application.

7. The provisioning system for supporting presence applications as recited in claim 1, wherein said structure operable to reference a domain-specific ontology model comprises a presence client software module operable to invoke a Universal Resource Locator (URL) path associated with said ontology depository including said domain-specific ontology model.

8. The provisioning system for supporting presence applications as recited in claim 1, wherein said structure associated with said presence entity is operable to dynamically reference a domain-specific ontology model of said ontology depository.

9. The provisioning system for supporting presence applications as recited in claim 1, wherein said structure associated with said presence entity is operable to effectuate a static reference to a domain-specific ontology model during said structure's compile time.

10. The provisioning system for supporting presence applications as recited in claim 1, wherein said particular presence application is selected from the group consisting of transportation applications, shipping and delivery applications, premises security monitoring applications, private enterprise applications, government agency applications, and instant messaging applications.

11. A service provisioning methodology for supporting presence applications, comprising:
providing an ontology depository having at least one domain-specific ontology model accessible via the Internet for a particular presence application, wherein the ontology model for the particular presence application includes a collection of:
abstracted entities that are appropriately classified;
relationships among the entities; and
information about how to collect presence data from persons, places and things; and
customizing a presence client software module associated with a presence entity by referencing a domain-specific ontology model of said ontology depository via the Internet, whereby said presence entity becomes operable to engage in a particular presence application relating to said domain-specific ontology model.

12. The service provisioning methodology for supporting presence applications as recited in claim 11, wherein said at least one domain-specific ontology model for a particular presence application comprises a Unified Markup Language (UML)-based data model.

13. The service provisioning methodology for supporting presence applications as recited in claim 11, wherein said at least one domain-specific ontology model for a particular presence application comprises an Extended Markup Language (XML)-based data model.

14. The service provisioning methodology for supporting presence applications as recited in claim 11, wherein said at least one domain-specific ontology model for a particular presence application comprises a semantic net data model.

15. The service provisioning methodology for supporting presence applications as recited in claim 11, wherein said at least one domain-specific ontology model for a particular presence application comprises a General Markup Language (GML)-based data model.

16. The service provisioning methodology for supporting presence applications as recited in claim 11, wherein said at least one domain-specific ontology model for a particular presence application comprises a data model based on a semantic software application selected from the group consisting of a Resource Description Framework (RDF) application, an Ontology Inference Layer (OIL) application, an Ontology Web Language (OWL) application, a Semantic Web Initiative (SWI)-compliant application, and a Meta Object Framework (MOP) application.

17. The service provisioning methodology for supporting presence applications as recited in claim 11, wherein said customizing a presence client software module associated with a presence entity is effectuated by invoking a Universal Resource Locator (URL) path associated with said ontology depository including said domain-specific ontology model.

18. The service provisioning methodology for supporting presence applications as recited in claim 11, wherein said customizing a presence client software module associated with a presence entity is effectuated by dynamically referencing a domain-specific ontology model of said ontology depository.

19. The service provisioning methodology for supporting presence applications as recited in claim 11, wherein said customizing a presence client software module associated with a presence entity is effectuated by a static reference to a domain-specific ontology model during said presence client software module's compile time.

20. The service provisioning methodology for supporting presence applications as recited in claim 11, wherein said particular presence application is selected from the group consisting of transportation applications, shipping and delivery applications, premises security monitoring applications, private enterprise applications, government agency applications, and instant messaging applications.

21. A system for provisioning presence applications over a presence service network, comprising:
   means operable to host an ontology depository accessible via the Internet that includes a domain-specific ontology model corresponding to each of a plurality of presence applications, wherein the ontology model for each of the plurality of presence applications includes a collection of:
      abstracted entities that are appropriately classified;
      relationships among the entities; and
      information about how to collect presence data from persons, places and things; and
   means for customizing a presence client software module associated with a presence entity with a particular presence application accessed from the ontology model via the Internet.

22. The system for provisioning presence applications over a presence service network as recited in claim 21, wherein said domain-specific ontology model comprises a Unified Markup Language (UML)-based data model.

23. The system for provisioning presence applications over a presence service network as recited in claim 21, wherein said domain-specific ontology model comprises an Extended Markup Language (XML)-based data model.

24. The system for provisioning presence applications over a presence service network as recited in claim 21, wherein said domain-specific ontology model comprises a semantic net data model.

25. The system for provisioning presence applications over a presence service network as recited in claim 21, wherein said domain-specific ontology model for a particular presence application comprises a General Markup Language (GML)-based data model.

26. The system for provisioning presence applications over a presence service network as recited in claim 21, wherein said domain-specific ontology model comprises a data model based on a semantic software application selected from the group consisting of a Resource Description Framework (RDF) application, an Ontology Inference Layer (OIL) application, an Ontology Web Language (OWL) application, a Semantic Web Initiative (SWI)-compliant application, and a Meta Object Framework (MOF) application.

27. The system for provisioning presence applications over a presence service network as recited in claim 21, wherein said means for customizing a presence client software module associated with a presence entity comprises means for referencing a domain-specific ontology model for a particular presence application using a Universal Resource Locator (URL) path associated with said ontology depository.

28. The system for provisioning presence applications over a presence service network as recited in claim 21, wherein said means for customizing a presence client software module associated with a presence entity is operable to dynamically reference a domain-specific ontology model of said ontology depository.

29. The system for provisioning presence applications over a presence service network as recited in claim 21, wherein said means for customizing a presence client software module associated with a presence entity is operable to effectuate a static reference to a domain-specific ontology model during said presence client software module's compile time.

30. The system for provisioning presence applications over a presence service network as recited in claim 21, wherein said particular presence application is selected from the group consisting of transportation applications, shipping and delivery applications, premises security monitoring applications, private enterprise applications, government agency applications, and instant messaging applications.

* * * * *